United States Patent
Aoki et al.

(10) Patent No.: US 12,334,546 B2
(45) Date of Patent: Jun. 17, 2025

(54) NON-AQUEOUS ELECTROLYTE SECONDARY BATTERY

(71) Applicants: Panasonic Corporation, Kadoma (JP); SANYO Electric Co., Ltd., Kadoma (JP)

(72) Inventors: Yoshinori Aoki, Osaka (JP); Takeshi Ogasawara, Osaka (JP); Shun Nomura, Osaka (JP)

(73) Assignees: PANASONIC HOLDINGS CORPORATION, Osaka (JP); PANASONIC ENERGY CO., LTD., Osaka (JP)

( * ) Notice: Subject to any disclaimer, the term of this patent is extended or adjusted under 35 U.S.C. 154(b) by 573 days.

(21) Appl. No.: 17/640,271

(22) PCT Filed: Jul. 30, 2020

(86) PCT No.: PCT/JP2020/029258
§ 371 (c)(1),
(2) Date: Mar. 3, 2022

(87) PCT Pub. No.: WO2021/049198
PCT Pub. Date: Mar. 18, 2021

(65) Prior Publication Data
US 2022/0336795 A1    Oct. 20, 2022

(30) Foreign Application Priority Data

Sep. 9, 2019  (JP) .................. 2019-163881

(51) Int. Cl.
*H01M 4/36* (2006.01)
*H01M 4/02* (2006.01)
(Continued)

(52) U.S. Cl.
CPC .......... *H01M 4/366* (2013.01); *H01M 4/134* (2013.01); *H01M 4/525* (2013.01);
(Continued)

(58) Field of Classification Search
CPC ...... H01M 4/366; H01M 4/134; H01M 4/525; H01M 10/0525; H01M 2004/027;
(Continued)

(56) References Cited

U.S. PATENT DOCUMENTS

2003/0031930 A1   2/2003  Hamano et al.
2012/0282524 A1  11/2012  Kono et al.

FOREIGN PATENT DOCUMENTS

CN    102668218 A    9/2012
CN    103050686 A    4/2013
(Continued)

OTHER PUBLICATIONS

Office Action dated Jan. 10, 2024, issued in counterpart CN Application No. 202080062311.4, with partial English translation. (13 pages).
(Continued)

*Primary Examiner* — Lisa S Park
(74) *Attorney, Agent, or Firm* — WHDA, LLP

(57) ABSTRACT

A non-aqueous electrolyte secondary battery that is an exemplary embodiment of the present invention, wherein a positive electrode contains a lithium-transition metal composite oxide containing Ni, Al and Sr as a positive electrode
(Continued)

active substance. In the lithium-transition metal composite oxide, the content of Ni is 80-95 mol %, the content of Al is 8.0 mol % or less, the content of Sr is 1.2 mol % or less, and the proportion of metallic elements other than Li that are present in a Li layer is 0.5-2.0 mol %. A negative electrode has a Sr-containing coating film formed on a surface of a negative electrode mixture layer. The content of Sr in the coating film is 20-400 ppm relative to the total mass of the negative electrode mixture layer and the coating film.

5 Claims, 1 Drawing Sheet

(51) Int. Cl.
*H01M 4/134* (2010.01)
*H01M 4/525* (2010.01)
*H01M 10/0525* (2010.01)

(52) U.S. Cl.
CPC .. *H01M 10/0525* (2013.01); *H01M 2004/027* (2013.01); *H01M 2004/028* (2013.01)

(58) Field of Classification Search
CPC ............ H01M 2004/028; H01M 4/131; C01G 53/66; Y02E 60/10
See application file for complete search history.

(56) References Cited

FOREIGN PATENT DOCUMENTS

| CN | 103474644 B | 8/2015 |
| JP | 9-115509 A | 5/1997 |
| JP | 2002-313339 A | 10/2002 |
| JP | 2002-313417 A | 10/2002 |
| JP | 2003-100295 A | 4/2003 |
| JP | 2007-299668 A | 11/2007 |
| JP | 2013-254639 A | 12/2013 |
| JP | 2016-170937 A | 9/2016 |

OTHER PUBLICATIONS

International Search Report dated Sep. 24, 2020, issued in counterpart International Application No. PCT/JP2020/029258, w/English Translation. (6 pages).
Extended European Search Report dated Sep. 9, 2022, issued in counterpart EP Application No. 20863879.1. (11 pages).
Wang Haibo et al: "Electrochemical performance of SrF2-coated anode material 0.5Li2MnO3 • 0.5LiNi1/3 Co1/3Mn1/3O2 for Li-ion batteries", Huagong Xinxing Cailiao—New Chemical Materials, Zhongguo Huagong Xinxi Zhongxin, CN, vol. 42, No. 5, May 1, 2014 (May 1, 2014), pp. 188-190, XP009538649; w/ English Abstract; Cited in Extended European Search Report dated Sep. 9, 2022. (3 pages).
Qi Li et al: "Progress in electrolytes for rechargeable Li-based batteries and beyond", Green Energy & Environment, vol. 1, No. 1, Apr. 1, 2016 (Apr. 1, 2016), pp. 18-42, XP055340290; Cited in Extended European Search Report dated Sep. 9, 2022. (25 pages).

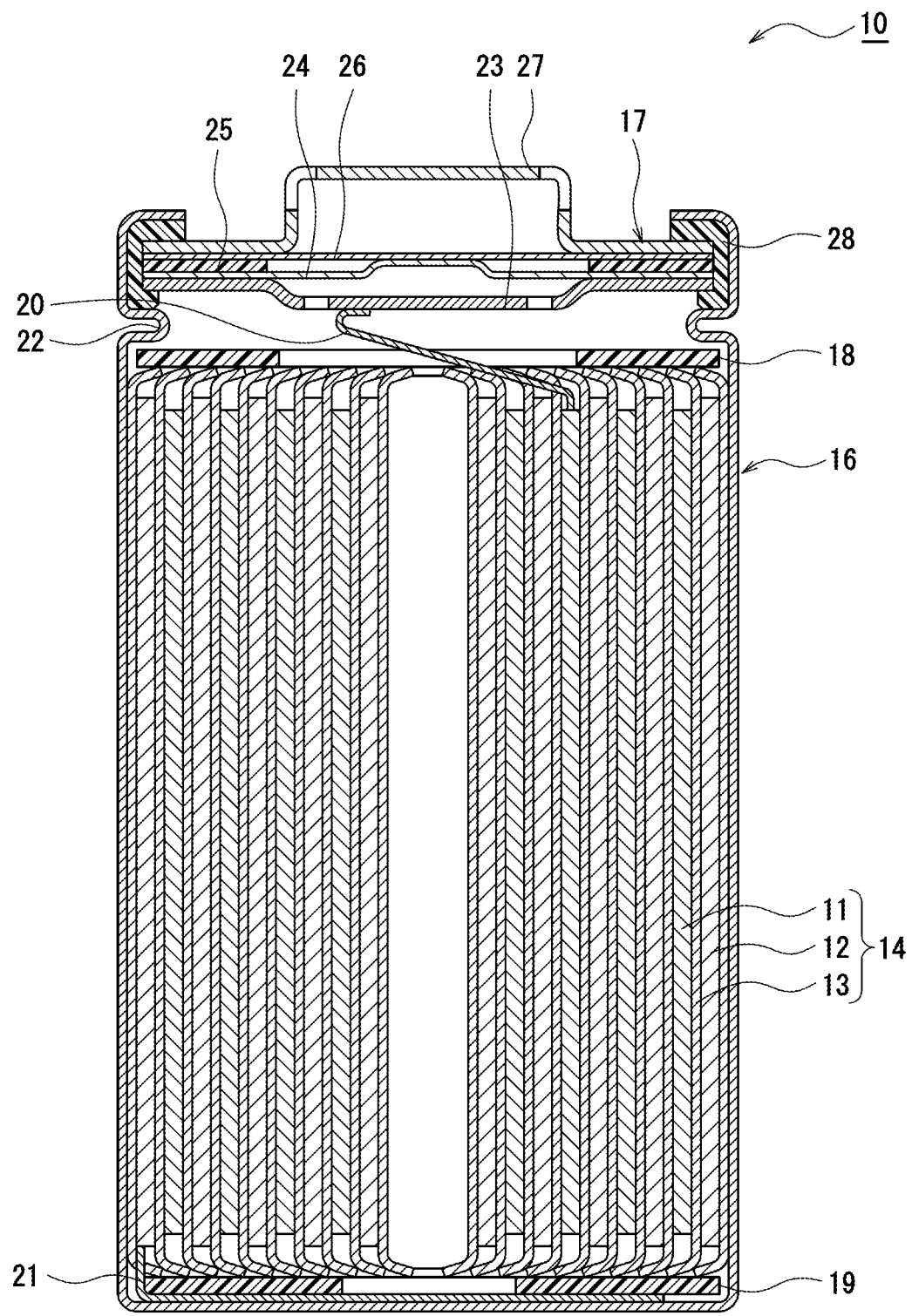

NON-AQUEOUS ELECTROLYTE SECONDARY BATTERY

CROSS-REFERENCE TO RELATED APPLICATIONS

This application is a national stage of International Application No.PCT/JP2020/029258, filed Jul. 30, 2020, which claims priority to Japanese Patent Application No. 2019-163881 filed Sep. 9, 2019 both of which are hereby incorporated by reference in their entirety.

TECHNICAL FIELD

The present disclosure generally relates to a non-aqueous electrolyte secondary battery, and more particularly to a non-aqueous electrolyte secondary battery using a lithium-transition metal composite oxide containing Ni as a positive electrode active material.

BACKGROUND ART

In recent years, a lithium-transition metal composite oxide with a high Ni content has attracted attention as a positive electrode active material with a high energy density. For example, Patent Literature 1 discloses a positive electrode active material for a non-aqueous electrolyte secondary battery, comprising a lithium-transition metal composite oxide represented by the general formula $Li_xNi_yCo_zM_mO_2$, wherein M is an element selected from the group consisting of Ba, Sr, and B, $0.9 \leq x \leq 1.1$, $0.5 \leq y \leq 0.95$, $0.05 \leq z \leq 0.5$, and $0.0005 \leq m \leq 0.02$, and having a BET specific surface area of 0.8 $m^2/g$ or less. Patent Literature 2 discloses a positive electrode active material for a non-aqueous electrolyte secondary battery, comprising a lithium-transition metal composite oxide containing at least one of the group consisting of Ni and Co and having a layered structure, wherein the lithium-transition metal composite oxide contains at least one of the group consisting of Sr, W, and Sb, and contains Mo.

CITATION LIST

Patent Literature

PATENT LITERATURE 1: Japanese Unexamined Patent Application Publication No. 2003-100295
PATENT LITERATURE 2: Japanese Unexamined Patent Application Publication No. 2007-299668

SUMMARY

When a lithium-transition metal composite oxide with a high Ni content is used for a positive electrode active material, a large amount of Li is extracted during charge, which destabilizes the layered structure of the composite oxide and a battery capacity is likely to be lowered associated with charging and discharging. The art disclosed in Patent Literatures 1 and 2 still has a room for improvement in charge-discharge cycle characteristics.

A non-aqueous electrolyte secondary battery of an aspect of the present disclosure comprises: a positive electrode; a negative electrode; and a non-aqueous electrolyte, wherein the positive electrode includes a lithium-transition metal composite oxide having a layered structure and containing at least Ni, Al, and Sr; in the lithium-transition metal composite oxide, a content of Ni is 80 to 95 mol % based on a total number of moles of metal elements excluding Li, a content of Al is 8.0 mol % or less based on the total number of moles of metal elements excluding Li, a content of Sr is 1.2 mol % or less based on the total number of moles of metal elements excluding Li, and a proportion of metal elements other than Li present in a Li layer is 0.5 to 2.0 mol % based on a total number of moles of metal elements excluding Li; the negative electrode has: a negative electrode mixture layer including a negative electrode active material; and a coating containing Sr formed on a surface of the negative electrode mixture layer; and a content of Sr in the coating based on a total mass of the negative electrode mixture layer and the coating is 20 to 400 ppm.

An aspect of the present disclosure may inhibit a lowering in capacity associated with charging and discharging in a non-aqueous electrolyte secondary battery using a lithium-transition metal composite oxide with a high Ni content. The non-aqueous electrolyte secondary battery according to the present disclosure has excellent charge-discharge cycle characteristics.

BRIEF DESCRIPTION OF DRAWING

FIG. 1 is a sectional view of a non-aqueous electrolyte secondary battery of an example of an embodiment.

DESCRIPTION OF EMBODIMENTS

When a lithium-transition metal composite oxide with a high Ni content, which has a highly active particle surface, is used as a positive electrode active material, a side reaction with an electrolyte occurs on the particle surface, resulting in damaged particle surface of the lithium-transition metal composite oxide. In addition, since a large amount of Li is extracted from the lithium-transition metal composite oxide during charge, repetition of charges and discharges leads to collapsed and destabilized layered structure of the lithium-transition metal composite oxide. Thus, it is considered that a non-aqueous electrolyte secondary battery using such a lithium-transition metal composite oxide as a positive electrode active material is likely to cause a battery capacity to be lowered associated with charging and discharging.

The present inventors have made intensive investigation to solve the problem, and as a result, have found that adding a predetermined amount of Sr in addition to a predetermined amount of Al into a lithium-transition metal composite oxide and substituting some Li in a Li layer with other metal elements stabilizes the layered structure of the lithium-transition metal composite oxide and forms a good coating containing Sr derived from a positive electrode on a surface of a negative electrode to protect the negative electrode. It is considered that Sr brings about modification near the surface of the lithium-transition metal composite oxide and that a synergistic effect of the stabilization of the layered structure by containing the predetermined amount of Al and substituting Li in the Li layer with the predetermined amount of other metal elements and of the good coating containing Sr and protecting the negative electrode improve charge-discharge cycle characteristics of the battery using the lithium-transition metal composite oxide. It is to be noted that, an excess amount of the other metal elements present in the Li layer inhibits dispersion of Li to cause increase in a resistance and lowering in the discharge capacity.

The description "a numerical value (A) to a numerical value (B)" herein means the numerical value (A) or more and the numerical value (B) or less.

Hereinafter, an example of an embodiment of the non-aqueous electrolyte secondary battery according to the present disclosure will be described in detail. Hereinafter, a cylindrical battery in which a wound electrode assembly 14 is housed in a bottomed cylindrical exterior housing can 16 will be exemplified, but an exterior housing body is not limited to a cylindrical exterior housing can and may be, for example, a rectangular exterior housing can and may be an exterior housing body constituted of laminated sheets including a metal layer and a resin layer. The electrode assembly may be a stacked electrode assembly in which a plurality of positive electrodes and a plurality of negative electrodes are alternatively stacked with separators interposed therebetween.

FIG. 1 is a sectional view of a non-aqueous electrolyte secondary battery 10 of an example of an embodiment. As exemplified in FIG. 1, the non-aqueous electrolyte secondary battery 10 comprises the wound electrode assembly 14, a non-aqueous electrolyte, and the exterior housing can 16 housing the electrode assembly 14 and the non-aqueous electrolyte. The electrode assembly 14 has a positive electrode 11, a negative electrode 12, and a separator 13, and has a wound structure in which the positive electrode 11 and the negative electrode 12 are spirally wound with the separator 13 interposed therebetween. The exterior housing can 16 is a bottomed cylindrical metallic container having an opening at one side in an axial direction, and the opening of the exterior housing can 16 is sealed with a sealing assembly 17. Hereinafter, for convenience of description, the sealing assembly 17 side of the battery will be described as the upper side, and the bottom side of the exterior housing can 16 will be described as the lower side.

The non-aqueous electrolyte includes a non-aqueous solvent and an electrolyte salt dissolved in the non-aqueous solvent. For the non-aqueous solvent, esters, ethers, nitriles, amides, a mixed solvent of two or more thereof, and the like are used, for example. The non-aqueous solvent may contain a halogen-substituted solvent in which at least some hydrogens in these solvents are substituted with halogen atoms such as fluorine. For the electrolyte salt, a lithium salt such as $LiPF_6$ is used, for example. The electrolyte is not limited to a liquid electrolyte, and may be a solid electrolyte using a gel polymer or the like.

Any of the positive electrode 11, negative electrode 12, and separator 13 constituting the electrode assembly 14 is a band-shaped elongated body, and spirally wound to be alternatively stacked in a radial direction of the electrode assembly 14. To prevent precipitation of lithium, the negative electrode 12 is formed to be one size larger than the positive electrode 11. That is, the negative electrode 12 is formed to be longer than the positive electrode 11 in a longitudinal direction and a width direction (short direction). Two separators 13 are formed to be one size larger than at least the positive electrode 11, and disposed to, for example, sandwich the positive electrode 11. The electrode assembly 14 has a positive electrode lead 20 connected to the positive electrode 11 by welding or the like and a negative electrode lead 21 connected to the negative electrode 12 by welding or the like.

Insulating plates 18 and 19 are disposed on the upper and lower sides of the electrode assembly 14, respectively. In the example illustrated in FIG. 1, the positive electrode lead 20 extends through a through hole in the insulating plate 18 toward a side of the sealing assembly 17, and the negative electrode lead 21 extends through an outside of the insulating plate 19 toward the bottom side of the exterior housing can 16. The positive electrode lead 20 is connected to a lower surface of an internal terminal plate 23 of the sealing assembly 17 by welding or the like, and a cap 27, which is a top plate of the sealing assembly 17 electrically connected to the internal terminal plate 23, becomes a positive electrode terminal. The negative electrode lead 21 is connected to a bottom inner surface of the exterior housing can 16 by welding or the like, and the exterior housing can 16 becomes a negative electrode terminal.

A gasket 28 is provided between the exterior housing can 16 and the sealing assembly 17 to achieve sealability inside the battery. On the exterior housing can 16, a grooved part 22 in which a part of a side part thereof projects inside for supporting the sealing assembly 17 is formed. The grooved part 22 is preferably formed in a circular shape along a circumferential direction of the exterior housing can 16, and supports the sealing assembly 17 with the upper surface thereof. The sealing assembly 17 is fixed on the upper part of the exterior housing can 16 with the grooved part 22 and with an end part of the opening of the exterior housing can 16 calked to the sealing assembly 17.

The sealing assembly 17 has a stacked structure of the internal terminal plate 23, a lower vent member 24, an insulating member 25, an upper vent member 26, and the cap 27 in this order from the electrode assembly 14 side. Each member constituting the sealing assembly 17 has, for example, a disk shape or a ring shape, and each member except for the insulating member 25 is electrically connected each other. The lower vent member 24 and the upper vent member 26 are connected at each of central parts thereof, and the insulating member 25 is interposed between each of the circumferential parts of the vent members 24 and 26. If the internal pressure of the battery increases due to abnormal heat generation, the lower vent member 24 is deformed so as to push the upper vent member 26 up toward the cap 27 side and breaks, and thereby a current pathway between the lower vent member 24 and the upper vent member 26 is cut off. If the internal pressure further increases, the upper vent member 26 breaks, and gas is discharged through the cap 27 opening.

Hereinafter, the positive electrode 11, negative electrode 12, and separator 13, which constitute the electrode assembly 14, particularly a positive electrode active material constituting the positive electrode 11 and a coating formed on a surface of the negative electrode 12 will be described in detail.

[Positive Electrode]

The positive electrode 11 has a positive electrode core body and a positive electrode mixture layer provided on a surface of the positive electrode core body. For the positive electrode core body, a foil of a metal stable within a potential range of the positive electrode 11, such as aluminum, a film in which such a metal is disposed on a surface layer thereof, and the like may be used. The positive electrode mixture layer includes a positive electrode active material, a binder, and a conductive agent, and is preferably provided on both surfaces of the positive electrode core body except for a portion to which the positive electrode lead 20 is connected. The positive electrode 11 may be produced by, for example, applying a positive electrode mixture slurry including the positive electrode active material, the binder, the conductive agent, and the like on the surface of the positive electrode core body, drying and subsequently compressing the applied film to form the positive electrode mixture layers on both the surfaces of the positive electrode core body.

Examples of the conductive agent included in the positive electrode mixture layer may include a carbon material such as carbon black, acetylene black, Ketjenblack, and graphite.

Examples of the binder included in the positive electrode mixture layer may include a fluororesin such as polytetrafluoroethylene (PTFE) and polyvinylidene fluoride (PVdF), polyacrylonitrile (PAN), a polyimide, an acrylic resin, and a polyolefin. With these resins, a cellulose derivative such as carboxymethyl cellulose (CMC) or a salt thereof, polyethylene oxide (PEO), and the like may be used in combination.

The positive electrode 11 includes a lithium-transition metal composite oxide having a layered structure and containing at least Ni, Al, and Sr. Hereinafter, for convenience of description, the lithium-transition metal composite oxide is referred to as "composite oxide (Z)". The composite oxide (Z) functions as the positive electrode active material. The composite oxide (Z) has, for example, a layered structure belonging to the space group R-3m or a layered structure belonging to the space group C2/m. The positive electrode active material is mainly composed of the composite oxide (Z), and may be composed of substantially only the composite oxide (Z). The positive electrode active material may include a composite oxide other than the composite oxide (Z) or another compound within a range in that an object of the present disclosure is not impaired.

The composite oxide (Z) is, for example, of secondary particles formed by aggregating primary particles. A particle diameter of the primary particles is typically 0.05 μm to 1 μm. A median diameter (D50) on a volumetric basis of the composite oxide (Z) is, for example, 3 μm to 30 μm, and preferably 5 μm to 25 μm. The D50 on a volumetric basis, also referred to as a median diameter, means a particle diameter at which a cumulative frequency is 50% from a smaller particle diameter side in a particle size distribution on a volumetric basis. The particle size distribution of the composite oxide (Z) may be measured by using a laser diffraction-type particle size distribution measuring device (for example, MT3000II, manufactured by MicrotracBEL Corp.) with water as a dispersion medium.

The composite oxide (Z) contains 80 to 95 mol % of Ni based on a total number of moles of metal elements excluding Li. With the content of Ni of 80 mol % or more, the battery with a high energy density may be obtained. Meanwhile, with the content of Ni of more than 95 mol %, the contents of Al and Sr are too low to achieve the stability of the layered structure of the composite oxide (Z). The content of Ni may be 85 mol % or more, or may be 90 mol % or more, based on the total number of moles of metal elements excluding Li.

In the composite oxide (Z), the content of Ni is 80 to 95 mol % or more based on the total number of moles of metal elements excluding Li, and the content of Al is 8.0 mol % or less based on the total number of moles of metal elements excluding Li. The content of Al may be 7.0 mol % or less, or may be 6.0 mol % or less. From the viewpoint of the stability of the layered structure of the composite oxide (Z), the lower limit of the content of Al is preferably 1.0 mol %, and more preferably 2.0 mol %.

The content of Sr in the composite oxide (Z) is 1.2 mol % or less, and preferably 1.0 mol % or less, based on the total number of moles of metal elements excluding Li. It is considered that Sr modifies the particle surface of the composite oxide (Z), and becomes a Sr source of the negative electrode coating to inhibit the side reaction with the electrolyte on the positive and negative electrodes. As long as the composite oxide (Z) contains Sr, the effect of improving the charge-discharge characteristics may be exerted; however, the content of Sr is preferably 0.02 mol % or more. In this case, the effect of improving the charge-discharge characteristics appears more obviously. With the content of Sr of more than 1.2 mol %, resistance increases to lower the charge capacity.

Sr is preferably present on and near the particle surface, for example, in a near surface region within 30 nm from the particle surface, of the composite oxide (Z). When the composite oxide (Z) is of secondary particles formed by aggregating primary particles, Sr is present on or near a surface of the primary particles. In other words, Sr is unevenly present near the surface of the primary particles of the composite oxide (Z), and the content rate of Sr per unit volume is higher on the surface of the primary particles than inside thereof. The distribution of Sr in the composite oxide (Z) may be analyzed with TEM-EDX and the like.

Sr is present as a compound in the layered structure or on the surface of the composite oxide (Z). Sr contained in the composite oxide (Z) is the Sr source of the negative electrode coating, as mentioned above, and some Sr are eluted to be deposited on the negative electrode surface by charging and discharging, and incorporated in the coating of the negative electrode.

The composite oxide (Z) may contain a metal element other than Li, Ni, Al, and Sr. Examples of the metal element may include Co, Mn, Zr, Mg, Fe, Cu, Zn, Sn, Na, K, Ba, Ca, W, Mo, Si, Nb, Bi, Ti, and Mo.

When the composite oxide (Z) contains Co, the content of Co is preferably 10 mol % or less based on the total number of moles of metal elements excluding Li. Since Co is expensive, it is preferable that the amount of Co used is small. The composite oxide (Z) may contain 5 mol % or less of Co based on the total number of moles of metal elements excluding Li, or may contain substantially no Co. The description "contain substantially no Co" means a case where Co is absolutely not contained and a case where Co is mixed as an impurity (a case where an amount of Co that cannot be precisely quantified is mixed).

When the composite oxide (Z) contains Mn, the content of Mn is preferably 10 mol % or less based on the total number of moles of metal elements excluding Li. A preferable example of the composite oxide (Z) is a composite oxide represented by the general formula $Li_aNi_bCo_cAl_dMn_eSr_fO_g$, wherein $0.8 \leq a \leq 1.2$, $0.80 \leq b \leq 0.95$, $0 \leq c \leq 0.05$, $0 < d \leq 0.08$, $0 \leq e \leq 0.10$, $0 < f \leq 0.012$, and $1 \leq g \leq 2$.

The Li layer of the composite oxide (Z) contains a metal element other than Li. The proportion of the metal elements other than Li present in the Li layer is 0.5 to 2.0 mol % based on the total number of moles of metal elements excluding Li. In this case, a structure of the Li layer in a state where Li ions in the Li layer are extracted is stabilized to improve the cycle characteristics. Meanwhile, with the proportion of less than 0.5 mol % or more than 2.0 mol %, the effect of improving the cycle characteristics is not obtained. The metal elements other than Li in the Li layer is considered to be mainly Ni, but another metal element may be included. The proportion of the metal elements other than Li present in the Li layer is determined by Rietveld analysis of an X-ray diffraction pattern obtained by X-ray diffraction measurement of the composite oxide (Z).

Contents of the elements constituting the composite oxide (Z) may be measured with an inductively coupled plasma atomic emission spectroscopy analyzer (ICP-AES), an electron probe micro analyzer (EPMA), an energy dispersive X-ray analyzer (EDX), or the like.

A method of manufacturing the composite oxide (Z) comprises: a first step of obtaining a metal composite oxide including Ni, Al, and an optional metal element; a second step of obtaining a mixture by mixing the metal composite oxide obtained in the first step and a Li compound; and a third step of calcining the mixture, for example. The proportion of the metal elements other than Li in the Li layer of the layered structure of the finally obtained composite oxide (Z) is adjusted by, for example, controlling a mixing ratio of the raw materials in the second step, the calcining temperature and calcination time in the third step, and the like.

In the first step, for example, with stirring a solution of metal salts including Ni, Al, and the optional metal element (such as Co, Mn, and Fe), a solution of an alkali such as sodium hydroxide is added dropwise for adjusting a pH on the alkali side (for example, 8.5 to 12.5) to precipitate (coprecipitate) a metal composite hydroxide including Ni, Al, and the optional metal element. Then, the metal composite hydroxide is calcined to obtain the metal composite oxide including Ni, Al, and the optional metal element. The calcining temperature is not particularly limited, and for example, within a range of 300° C. to 600° C.

In the second step, the metal composite oxide obtained in the first step, the lithium compound, and a strontium compound are mixed to obtain the mixture. Examples of the lithium compound include $Li_2CO_3$, LiOH, $Li_2O_2$, $Li_2O$, $LiNO_3$, $LiNO_2$, $Li_2SO_4$, $LiOH \cdot H_2O$, LiH, and LiF. Examples of the strontium compound include $Sr(OH)_2$, SrO, $SrCO_3$, $SrSO_4$, and $Sr(NO_3)_2$. A mixing ratio of the metal composite oxide obtained in the first step and the Li compound is preferably within a range of, for example, 1:0.98 to 1:1.1 of a molar ratio of the metal element excluding Li:Li, from the viewpoint of easily adjusting the above parameter within the specified range. In the second step, another metal raw material may be added, if necessary, with mixing the metal composite oxide obtained in the first step, the Li compound, and the Sr compound. The other metal raw material is an oxide, hydroxide, or the like, which includes a metal element other than the metal element constituting the metal oxide obtained in the first step.

In the third step, the mixture obtained in the second step is calcined at the predetermined temperature and in the predetermined time to obtain the composite oxide (Z) according to the present embodiment. Calcining the mixture in the third step comprises, for example, a multi-stage calcining step including: a first calcining step of calcining the mixture in a calcination furnace under an oxygen flow to a first set temperature, which is 450° C. or higher and 680° C. or lower, at a first heating rate; and a second calcining step of calcining the calcined product obtained in the first calcining step in a calcination furnace under an oxygen flow to a second set temperature, which is higher than 680° C. and 800° C. or lower, at a second heating rate.

Here, the first heating rate is within a range of 1.5° C./min or higher and 5.5° C./min or lower. The second heating rate, which is lower than the first heating rate, is within a range of 0.1° C./min or higher and 3.5° C./min or lower. In the finally obtained composite oxide (Z) of the present embodiment, such a multi-stage calcination may adjust the parameter of the rate of the metal elements other than Li present in the Li layer in the layered structure and the like within the specified range. It is to be noted that the first heating rate and the second heating rate may be plurally set in each temperature range as long as the heating rates are within the specified ranges.

A holding time at the first set temperature in the first calcining step is preferably 0 hours or longer and 5 hours or shorter, and more preferably 0 hours or longer and 3 hours or shorter, from the viewpoint of adjusting the parameter of the composite oxide (Z) within the specified range. The holding time at the first set temperature is referred to a time of maintaining the first set temperature after the temperature reaches the first set temperature. A holding time at the second set temperature in the second calcining step is preferably 1 hour or longer and 10 hours or shorter, and more preferably 1 hour or longer and 5 hours or shorter, from the viewpoint of adjusting each of the parameters of the lithium-transition metal composite oxide within the specified range. The holding time at the second set temperature is referred to a time of maintaining the second set temperature after the temperature reaches the second set temperature.

The calcination of the mixture is performed, for example, in an oxygen flow with an oxygen concentration of 60% or higher, and with a flow rate of the oxygen flow within a range of 0.2 mL/min to 4 mL/min per 10 $cm^3$ of the calcination furnace and 0.3 L/min or higher per 1 kg of the mixture, from the viewpoint of adjusting each of the parameters within the specified range.

[Negative Electrode]

The negative electrode 12 has a negative electrode core body and a negative electrode mixture layer provided on a surface of the negative electrode core body. For the negative electrode core body, a foil of a metal stable within a potential range of the negative electrode 12, such as copper, a film in which such a metal is disposed on a surface layer thereof, and the like may be used. The negative electrode mixture layer includes a negative electrode active material and a binder, and is preferably provided on, for example, both surfaces of the negative electrode core body except for a portion to which the negative electrode lead 21 is connected. The negative electrode 12 may be produced by, for example, applying a negative electrode mixture slurry including the negative electrode active material, the binder, and the like on the surface of the negative electrode core body, drying and subsequently compressing the applied film to form the negative electrode mixture layers on both the surfaces of the negative electrode core body.

The negative electrode mixture layer includes, for example, a carbon-based active material to reversibly occlude and release lithium ions, as the negative electrode active material. The carbon-based active material is preferably a graphite such as: a natural graphite such as flake graphite, massive graphite, and amorphous graphite; and an artificial graphite such as massive artificial graphite (MAG) and graphitized mesophase-carbon microbead (MCMB). For the negative electrode active material, a Si-based active material composed of at least one of Si and a Si-containing compound may also be used, and the carbon-based active material and the Si-based active material may be used in combination.

For the binder included in the negative electrode mixture layer, a fluororesin, PAN, a polyimide, an acrylic resin, a polyolefin, and the like may be used similar to that in the positive electrode 11, but styrene-butadiene rubber (SBR) is preferably used. The negative electrode mixture layer preferably further includes CMC or a salt thereof, polyacrylic acid (PAA) or a salt thereof, polyvinyl alcohol (PVA), and the like. Among them, SBR; and CMC or a salt thereof, or PAA or a salt thereof are preferably used in combination.

The negative electrode 12 has a coating formed on a surface of the negative electrode mixture layer and containing Sr (hereinafter, which may be referred to as "negative electrode coating"). The negative electrode coating is considered to be formed by deposition of Sr in the composite oxide (Z), eluted by charging and discharging, on the surface of the negative electrode mixture layer. That is, the negative electrode coating contains Sr derived from the composite oxide (Z). The negative electrode coating is formed by, for example, charges and discharges in 10 cycles or fewer. Use of the composite oxide (Z) containing a specific amount of Sr and formation of a good coating containing Sr derived from the positive electrode on the surface of the negative electrode inhibit a lowering in capacity during charge and discharge to yield good cycle characteristics. The negative electrode coating may be detected by, for example, X-ray photoelectron spectroscopy analysis (XPS).

The content of Sr in the negative electrode coating is 20 to 400 ppm based on a total mass of the negative electrode mixture layer and the coating. With the content of Sr of less than 20 ppm or more than 400 ppm, the effect of improving the charge-discharge cycle characteristics is not obtained. The content of Sr in the negative electrode coating may be regulated with a composition of the composite oxide (Z), particularly the content of Sr in the composite oxide (Z), charge-discharge conditions such as a charge termination voltage and a charge-discharge test temperature, or the like.

The negative electrode coating may further contain Ni. Ni in the composite oxide (Z), eluted by charging and discharging, is considered to be deposited with Sr on the surface of the negative electrode mixture layer to form the negative electrode coating. That is, the negative electrode coating contains Ni derived from the composite oxide (Z). A mass ratio of Sr to Ni in the coating (Ni/Sr) is preferably 0.3 to 2.0. The Ni/Sr ratio within the aforementioned range may enhance the effect of improving the cycle characteristics. The Ni/Sr ratio may be regulated with a composition of the composite oxide (Z), particularly a content ratio of Sr and Ni, charge-discharge conditions such as the charge termination voltage and the charge-discharge test temperature, or the like.

The negative electrode coating may further contain Al. The negative electrode coating contains Al derived from the composite oxide (Z). A mass ratio of Al to Sr (Al/Sr) in the coating is preferably 0.3 to 20.0. With the Al/Sr ratio within this range, the effect of improving the cycle characteristics may be enhanced. The Al/Sr ratio may be regulated with a composition of the composite oxide (Z), particularly a content ratio of Sr and Al, charge-discharge conditions such as the charge termination voltage and the charge-discharge test temperature, or the like.

The negative electrode coating may contain a metal element other than Sr, Ni, and Al. The negative electrode coating includes, for example, a metal element such as Sr, Ni, and Al, and an organic compound being a decomposition product of the electrolyte. The contents of Sr, Ni, and Al, mass ratio of Ni/Sr, and mass ratio of Al/Sr in the negative electrode coating may be determined by unpacking a battery after charge and discharge to take the negative electrode, dissolving the negative electrode mixture layer, and analyzing the solution with ICP-AES.

[Separator]

For the separator 13, a porous sheet having an ion permeation property and an insulation property is used. Specific examples of the porous sheet include a fine porous thin film, a woven fabric, and a nonwoven fabric. As a material for the separator 13, a polyolefin such as polyethylene and polypropylene, cellulose, and the like are preferable. The separator 13 may have any of a single-layered structure and a multilayered structure.

On a surface of the separator, a heat-resistant layer and the like may be formed.

EXAMPLES

Hereinafter, the present disclosure will be further described with Examples, but the present disclosure is not limited to these Examples.

Example 1

[Synthesis of Lithium-Transition Metal Composite Oxide (Positive Electrode Active Material)]

A metal composite oxide represented by the general formula $Ni_{0.82}Co_{0.05}Al_{0.03}Mn_{0.10}O_2$ and strontium hydroxide $(Sr(OH)_2)$ were mixed so that a Sr content was 0.08 mol % based on a total amount of Ni, Co, Al, and Mn in the metal composite oxide, and then lithium hydroxide (LiOH) was mixed so that a molar ratio of the total amount of Ni, Co, Al, Mn, and Sr to Li was 1:1.05. The mixture was calcined under an oxygen flow of an oxygen concentration of 95% (a flow rate of 5 L/min per 1 kg of the mixture) at a heating rate of 2.0° C./min from a room temperature to 650° C. Then, the mixture was calcined at a heating rate of 0.5° C./min from 650° C. to 780° C. The calcined product was washed with water for removing an impurity to obtain a lithium-transition metal composite oxide. A composition of the lithium-transition metal composite oxide was analyzed with ICP-AES, and was $Li_{0.99}Ni_{0.8192}Co_{0.05}Al_{0.03}Mn_{0.10}Sr_{0.0008}O_2$.

[Production of Positive Electrode]

The above lithium-transition metal composite oxide was used as the positive electrode active material. The positive electrode active material, acetylene black, and polyvinylidene fluoride (PVdF) were mixed at a solid-content mass ratio of 95:3:2, an appropriate amount of N-methyl-2-pyrrolidone (NMP) was added, and then the mixture was kneaded to prepare a positive electrode mixture slurry. This positive electrode mixture slurry was applied on both surfaces of a positive electrode core body made of aluminum foil, the applied film was dried, and then rolled using a roller and cut to a predetermined electrode size to obtain a positive electrode in which the positive electrode mixture layer was formed on both the surfaces of the positive electrode core body. An exposed part where a surface of the positive electrode core body was exposed was provided at a part of the positive electrode.

[Production of Negative Electrode]

Natural graphite was used as the negative electrode active material. The negative electrode active material, carboxymethyl cellulose sodium salt (CMC-Na), and styrene-butadiene rubber (SBR) were mixed at a solid-content mass ratio of 100:1:1 in an aqueous solution to prepare a negative electrode mixture slurry. This negative electrode mixture slurry was applied on both surfaces of a negative electrode core body made of copper foil, the applied film was dried, and then rolled using a roller and cut to a predetermined electrode size to obtain a negative electrode in which the negative electrode mixture layer was formed on both the surfaces of the negative electrode core body. An exposed part where a surface of the negative electrode core body was exposed was provided at a part of the negative electrode.

[Preparation of Non-Aqueous Electrolyte]

Into a mixed solvent of ethylene carbonate (EC), methyl ethyl carbonate (MEC), and dimethyl carbonate (DMC) at a volume ratio of 3:3:4, lithium hexafluorophosphate ($LiPF_6$) was dissolved at a concentration of 1.2 mol/litter to prepare a non-aqueous electrolyte liquid.

[Production of Test Cell (Non-Aqueous Electrolyte Secondary Battery)]

An aluminum lead was attached to the exposed part of the positive electrode, a nickel lead was attached to the exposed part of the negative electrode, the positive electrode and the negative electrode were spirally wound with a separator made of polyolefin interposed therebetween and then press-formed in the radial direction to produce a flat, wound electrode assembly. This electrode assembly was housed in an exterior housing body composed of an aluminum laminated sheet, the above non-aqueous electrolyte liquid was injected thereinto, and an opening of the exterior housing body was sealed to obtain a test cell.

On the lithium-transition metal composite oxide, a proportion of the metal elements other than Li in the Li layer was evaluated by the following method. On the test cell, each of the Sr content, Ni/Sr ratio, Al/Sr ratio in the coating formed on the surface of the negative electrode, and charge-discharge characteristics was evaluated by the following method. The evaluation results are shown in Table 1 (the same applies to Examples and Comparative Examples, described below).

[Proportion of Metal Elements Other than Li in Li Layer of Lithium-Transition Metal Composite Oxide]

The proportion of the metal elements other than Li in the Li layer is determined by Rietveld analysis of an X-ray diffraction pattern obtained by X-ray diffraction measurement of the lithium-transition metal composite oxide. The X-ray diffraction pattern is obtained by powder X-ray diffraction method using a powder X-ray diffraction apparatus (manufactured by Rigaku Corporation, product name "RINT-TTR", radiation source Cu-Kα) and with the following conditions.

Measuring Range: 15-120°
Scanning Rate: 4°/min
Analyzing Range: 30-120°
Background: B-spline
Profile Function: Split pseudo-Voigt function
Restricting Condition: Li(3a)+Ni(3a)=1
Ni(3a)+Ni(3b)=y (y represents each Ni content ratio)
ICSD No.: 98-009-4814

For the Rietveld analysis of the X-ray diffraction pattern, PDXL2 (Rigaku Corporation), which is a software for Rietveld analysis, is used.

[Evaluation of Negative Electrode Coating]

A test cell after a cycle test, described below, was unpacked to take the negative electrode, and the negative electrode mixture layer was dissolved to determine the Sr content, Ni/Sr ratio, and Al/Sr ratio in the coating formed on the surface of the negative electrode mixture layer with ICP-AES. The Sr content in the coating was 56 ppm based on a total mass of the negative electrode mixture layer and the coating included in the test cell. The Ni/Sr ratio was 1.0, and the Al/Sr ratio was 8.2.

[Evaluation of Charge-Discharge Cycle Characteristics (Capacity Maintenance Rate after Cycle Test)]

The test cell was charged at a constant current of 0.2 It until a battery voltage reached 4.2 V under a temperature environment of 25° C., and charged at a constant voltage of 4.2 V until a current value reached 1/100 It. Then, the test cell was discharged at a constant current of 0.2 It until a battery voltage reached 2.5 V. This charge-discharge cycle was repeated 30 times. In the cycle test, a discharge capacity at the 1st cycle and a discharge capacity at the 30th cycle were determined, and the capacity maintenance rate was calculated with the following formula.

Capacity Maintenance Rate (%)=(Discharge Capacity at 30th Cycle/Discharge Capacity at 1st Cycle)×100

Example 2

A test cell was produced and evaluated in the same manner as in Example 1 except that a metal composite oxide represented by the general formula $Ni_{0.90}Co_{0.05}Al_{0.05}O_2$ was used, the metal composite oxide and $Sr(OH)_2$ were mixed so that the Sr content was 0.05 mol %, the metal composite oxide and lithium hydroxide (LiOH) were mixed so that a molar ratio of the total amount of Ni, Co, Al, Mn, and Sr to Li was 1:1.03, and the mixture was calcined at a heating rate of 2.0° C./min from a room temperature to 650° C. and then calcined at a heating rate of 0.5° C./min from 650° C. to 730° C., in the synthesis of the positive electrode active material.

Example 3

A test cell was produced and evaluated in the same manner as in Example 2 except that the metal composite oxide and lithium hydroxide (LiOH) were mixed so that a molar ratio of the total amount of Ni, Co, Al, Mn, and Sr to Li was 1:1.05 in the synthesis of the positive electrode active material.

Example 4

A test cell was produced and evaluated in the same manner as in Example 2 except that $Sr(OH)_2$ was added so that the Sr content was 0.08 mol % in the synthesis of the positive electrode active material.

Example 5

A test cell was produced and evaluated in the same manner as in Example 2 except that $Sr(OH)_2$ was added so that the Sr content was 0.10 mol % in the synthesis of the positive electrode active material.

Example 6

A test cell was produced and evaluated in the same manner as in Example 2 except that $Sr(OH)_2$ was added so that the Sr content was 0.50 mol %, and the mixture was calcined at a heating rate of 4.0° C./min from a room temperature to 650° C. and then calcined at a heating rate of 1.0° C./min from 650° C. to 730° C., in the synthesis of the positive electrode active material.

Example 7

A test cell was produced and evaluated in the same manner as in Example 2 except that $Sr(OH)_2$ was added so that the Sr content was 1.00 mol %, and the oxygen flow rate was 8 L/min per 1 kg of the mixture, in the synthesis of the positive electrode active material.

Example 8

A test cell was produced and evaluated in the same manner as in Example 1 except that a metal composite oxide represented by the general formula $Ni_{0.92}Al_{0.05}Mn_{0.03}O_2$ was used, the mixture was calcined at a heating rate of 2.0° C./min from a room temperature to 650° C. and then calcined at a heating rate of 0.5° C./min from 650° C. to 700° C., and the metal composite oxide and lithium hydroxide (LiOH) were mixed so that a molar ratio of the total amount of Ni, Al, Mn, and Sr to Li was 1:1.03, in the synthesis of the positive electrode active material.

Example 9

A test cell was produced and evaluated in the same manner as in Example 8 except that the metal composite oxide and lithium hydroxide (LiOH) were mixed so that a molar ratio of the total amount of Ni, Al, Mn, and Sr to Li was 1:1.01 in the synthesis of the positive electrode active material.

Comparative Example 1

A test cell was produced and evaluated in the same manner as in Example 1 except that no $Sr(OH)_2$ was added in the synthesis of the positive electrode active material.

Comparative Example 2

A test cell was produced and evaluated in the same manner as in Example 7 except that a metal composite oxide represented by the general formula $Ni_{0.90}Mn_{0.10}O_2$ was used, and the metal composite oxide and lithium hydroxide (LiOH) were mixed so that a molar ratio of the total amount of Ni, Mn, and Sr to Li was 1:1.1, in the synthesis of the positive electrode active material.

Comparative Example 3

A test cell was produced and evaluated in the same manner as in Example 2 except that no $Sr(OH)_2$ was added in the synthesis of the positive electrode active material.

Comparative Example 4

A test cell was produced and evaluated in the same manner as in Example 7 except that magnesium hydroxide $(Mg(OH)_2)$ was added instead of $Sr(OH)_2$ in the synthesis of the positive electrode active material.

Comparative Example 5

A test cell was produced and evaluated in the same manner as in Example 7 except that barium hydroxide $(Ba(OH)_2)$ was added instead of $Sr(OH)_2$ in the synthesis of the positive electrode active material.

Comparative Example 6

A test cell was produced and evaluated in the same manner as in Example 9 except that the metal composite oxide and lithium hydroxide (LiOH) were mixed so that a molar ratio of the total amount of Ni, Al, Mn, and Sr to Li was 1:1.15 in the synthesis of the positive electrode active material.

Comparative Example 7

A test cell was produced and evaluated in the same manner as in Example 9 except that the mixture was calcined at a heating rate of 6.0° C./min from a room temperature to 650° C. and then calcined at a heating rate of 5.0° C./min from 650° C. to 750° C. in the synthesis of the positive electrode active material.

Comparative Example 8

A test cell was produced and evaluated in the same manner as in Example 9 except that $Sr(OH)_2$ was added so that the Sr content was 1.50 mol % in the synthesis of the positive electrode active material.

TABLE 1

| | Positive electrode active material | | | | | | Negative electrode coating | | | Cycle test Capacity |
|---|---|---|---|---|---|---|---|---|---|---|
| | Ni | Co | Al | Mn | Additional element | M in Li layer | Sr content | Ni/Sr | Al/Sr | maintenance rate |
| Example 1 | 82 | 5 | 3 | 10 | Sr 0.08 mol % | 1.7 mol % | 56 ppm | 1.0 | 8.2 | 94.5% |
| Example 2 | 90 | 5 | 5 | — | Sr 0.05 mol % | 1.2 mol % | 40 ppm | 1.3 | 11.7 | 96.8% |
| Example 3 | 90 | 5 | 5 | — | Sr 0.05 mol % | 0.7 mol % | 31 ppm | 1.4 | 15.1 | 95.5% |
| Example 4 | 90 | 5 | 5 | — | Sr 0.08 mol % | 0.9 mol % | 43 ppm | 1.3 | 10.0 | 97.1% |
| Example 5 | 90 | 5 | 5 | — | Sr 0.1 mol % | 1.1 mol % | 72 ppm | 0.9 | 7.5 | 96.0% |
| Example 6 | 90 | 5 | 5 | — | Sr 0.5 mol % | 0.6 mol % | 197 ppm | 0.5 | 3.8 | 94.6% |
| Example 7 | 90 | 5 | 5 | — | Sr 1 mol % | 1.0 mol % | 274 ppm | 0.3 | 0.2 | 94.5% |
| Example 8 | 92 | — | 5 | 3 | Sr 0.05 mol % | 1.5 mol % | 29 ppm | 1.8 | 18.3 | 95.8% |
| Example 9 | 92 | — | 5 | 3 | Sr 0.1 mol % | 1.8 mol % | 65 ppm | 2.1 | 12.4 | 94.3% |
| Comparative Example 1 | 82 | 5 | 3 | 10 | — | 2.4 mol % | — | — | — | 92.9% |
| Comparative Example 2 | 90 | — | — | 10 | Sr 1 mol % | 1.8 mol % | 212 ppm | 0.4 | 0.2 | 93.5% |
| Comparative Example 3 | 90 | 5 | 5 | — | — | 0.9 mol % | — | — | — | 93.2% |
| Comparative Example 4 | 90 | 5 | 5 | — | Mg 1 mol % | 1.1 mol % | — | — | — | 93.1% |
| Comparative Example 5 | 90 | 5 | 5 | — | Ba 1 mol % | 1.4 mol % | — | — | — | 90.6% |
| Comparative Example 6 | 92 | — | 5 | 3 | Sr 0.1 mol % | 0.3 mol % | 71 ppm | 1.1 | 8.8 | 91.4% |
| Comparative Example 7 | 92 | — | 5 | 3 | Sr 0.1 mol % | 2.8 mol % | 62 ppm | 1.3 | 9.4 | 91.2% |
| Comparative Example 8 | 92 | — | 5 | 3 | Sr 1.5 mol % | 1.0 mol % | 450 ppm | 0.2 | 0.1 | 92.1% |

As shown in Table 1, any of the test cells in Examples has a higher capacity maintenance rate after the cycle test than the test cells in Comparative Examples, and has excellent charge-discharge cycle characteristics. When no Sr is contained in the positive electrode active material and no coating containing Sr is formed on the surface of the negative electrode (Comparative Examples 1, and 3 to 5), the discharge capacity after the cycle test is much lowered. When no Al is contained in the positive electrode active material (Comparative Example 2), when the proportion of the metal elements other than Li in the Li layer is out of the range of 0.5 to 2.0 mol % even with containing Sr in the positive electrode active material (Comparative Examples 6 and 7), and when the Sr content in the negative electrode coating is more than 400 ppm (Comparative Example 8), the discharge capacity is also much lowered. In other words, a synergistic effect of the positive electrode active material containing the specific amounts of Al and Sr and containing the specific amount of the metal elements other than Li in the Li layer and the negative electrode coating containing the specific amount of Sr derived from the positive electrode active material remarkably improves the charge-discharge characteristics of the battery.

REFERENCE SIGNS LIST

10 Secondary battery
11 Positive electrode
12 Negative electrode
13 Separator
14 Electrode assembly
16 Exterior housing can
17 Sealing assembly
18, 19 Insulating plate
20 Positive electrode lead
21 Negative electrode lead
22 Grooved part
23 Internal terminal plate
24 Lower vent member
25 Insulating member
26 Upper vent member
27 Cap
28 Gasket

The invention claimed is:

1. A non-aqueous electrolyte secondary battery, comprising:
a positive electrode;
a negative electrode; and
a non-aqueous electrolyte, wherein
the positive electrode includes a lithium-transition metal composite oxide having a layered structure and containing at least Ni, Al, and Sr;
in the lithium-transition metal composite oxide,
a content of Ni is 80 to 95 mol % based on a total number of moles of metal elements excluding Li,
a content of Al is 8.0 mol % or less based on the total number of moles of metal elements excluding Li,
a content of Sr is 1.2 mol % or less based on the total number of moles of metal elements excluding Li, and
a proportion of metal elements other than Li present in a Li layer is 0.5 to 2.0 mol % based on a total number of moles of metal elements excluding Li present in the lithium-transition metal composite oxide as a whole;
the negative electrode has: a negative electrode mixture layer including a negative electrode active material; and a coating containing Sr formed on a surface of the negative electrode mixture layer; and
a content of Sr in the coating based on a total mass of the negative electrode mixture layer and the coating is 20 to 400 ppm.

2. The non-aqueous electrolyte secondary battery according to claim 1, wherein the coating further contains Ni.

3. The non-aqueous electrolyte secondary battery according to claim 2, wherein a mass ratio of Ni to Sr (Ni/Sr) in the coating is 0.3 to 2.0.

4. The non-aqueous electrolyte secondary battery according to claim 1, wherein the coating further contains Al.

5. The non-aqueous electrolyte secondary battery according to claim 4, wherein a mass ratio of Sr to Al in the coating, Al/Sr, is 0.3 to 20.0.

* * * * *